US012602978B2

(12) United States Patent
Saucedo

(10) Patent No.: US 12,602,978 B2
(45) Date of Patent: Apr. 14, 2026

(54) FIREARM MONITORING SYSTEM

(71) Applicant: Joe Saucedo, Bismark, ND (US)

(72) Inventor: Joe Saucedo, Bismark, ND (US)

( * ) Notice: Subject to any disclaimer, the term of this patent is extended or adjusted under 35 U.S.C. 154(b) by 57 days.

(21) Appl. No.: 18/604,120

(22) Filed: Mar. 13, 2024

(65) Prior Publication Data

US 2025/0292667 A1 Sep. 18, 2025

(51) Int. Cl.
*G08B 23/00* (2006.01)
*G08B 21/02* (2006.01)

(52) U.S. Cl.
CPC .................................... *G08B 21/02* (2013.01)

(58) Field of Classification Search
CPC ...................................................... G08B 21/02
USPC ...................................................... 340/573.1
See application file for complete search history.

(56) References Cited

U.S. PATENT DOCUMENTS 9,057,580 B2 * 6/2015 Rorick ................ F41C 33/0263
9,062,933 B1 * 6/2015 Allen ...................... F21V 21/34
9,395,132 B2 7/2016 Stewart
9,752,840 B1 9/2017 Betro
9,829,275 B2 * 11/2017 Madrid ............... F41C 33/0209
9,897,407 B2 2/2018 Kramer
10,819,959 B2 10/2020 Palazzolo
D900,949 S 11/2020 Deng
10,996,012 B2 5/2021 Deng
11,156,419 B1 10/2021 Wang
2010/0321186 A1 * 12/2010 Crook .................... G08B 25/10 340/568.6
2014/0215885 A1 * 8/2014 Sullivan ................ F41A 17/066 42/84
2015/0369554 A1 * 12/2015 Kramer .................. H04N 9/806 386/227
2017/0248388 A1 * 8/2017 Young ................... F41A 17/063

FOREIGN PATENT DOCUMENTS

WO WO2015195507 12/2015

* cited by examiner

*Primary Examiner* — Tai T Nguyen

(57) ABSTRACT

A firearm monitoring system for monitoring usage of a firearm includes a monitor module including a housing and a monitor connector for mounting the housing to the firearm. The monitor module includes various electronic components for capturing data such as video, audio, location data, orientation data, and the like. A processor causes the data to be collected and transmitted to a remote observer device upon the processor determining via sensors that the firearm has been unholstered. A separate remote control device may be used to control the monitor module. A separate search notification module may be used to send notifications to the remote observer device, and a support pad may be used to support items and trigger the processor to collect and transmit data.

18 Claims, 12 Drawing Sheets

FIREARM MONITORING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to data collection systems and more particularly pertains to a new data collection system for monitoring usage of a firearm.

(2) Description of Related Art Including Information Disclosed Under 37 CFR 1.97 and 1.98

Myriad data collection systems are known to the prior art which attach to a firearm and collect data related to usage of the firearm such as video taken in a direction of fire of the firearm, audio, and geographic location of the firearm. However, the prior art fails to disclose such a system in which components are used to collect data related to an orientation of the firearm, instances of firing the firearm, video, audio, and geographic location of the firearm and transmit the collected data to a remote device. The prior art also fails to describe a separate component which may be used to initiate timers related to searching an area for intruders and an alert mechanism which actuates when such timers reach their ends.

BRIEF SUMMARY OF THE INVENTION

An embodiment of the disclosure meets the needs presented above by generally comprising a monitor module including a housing and a monitor connector for mounting the housing to a firearm. A processor is mounted in the housing. A camera is mounted to a front side of the housing and faces outwardly away from the housing. A monitor transceiver also is mounted in the housing. The camera and the monitor transceiver are operatively coupled to the processor. The monitor transceiver is configured to transmit data to and receive data from a remote control device and a remote observer device. The processor is programmed to detect an unholstering motion of the firearm and transmit images captured by the camera to the remote observer device via the monitor transceiver upon detection of the unholstering motion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
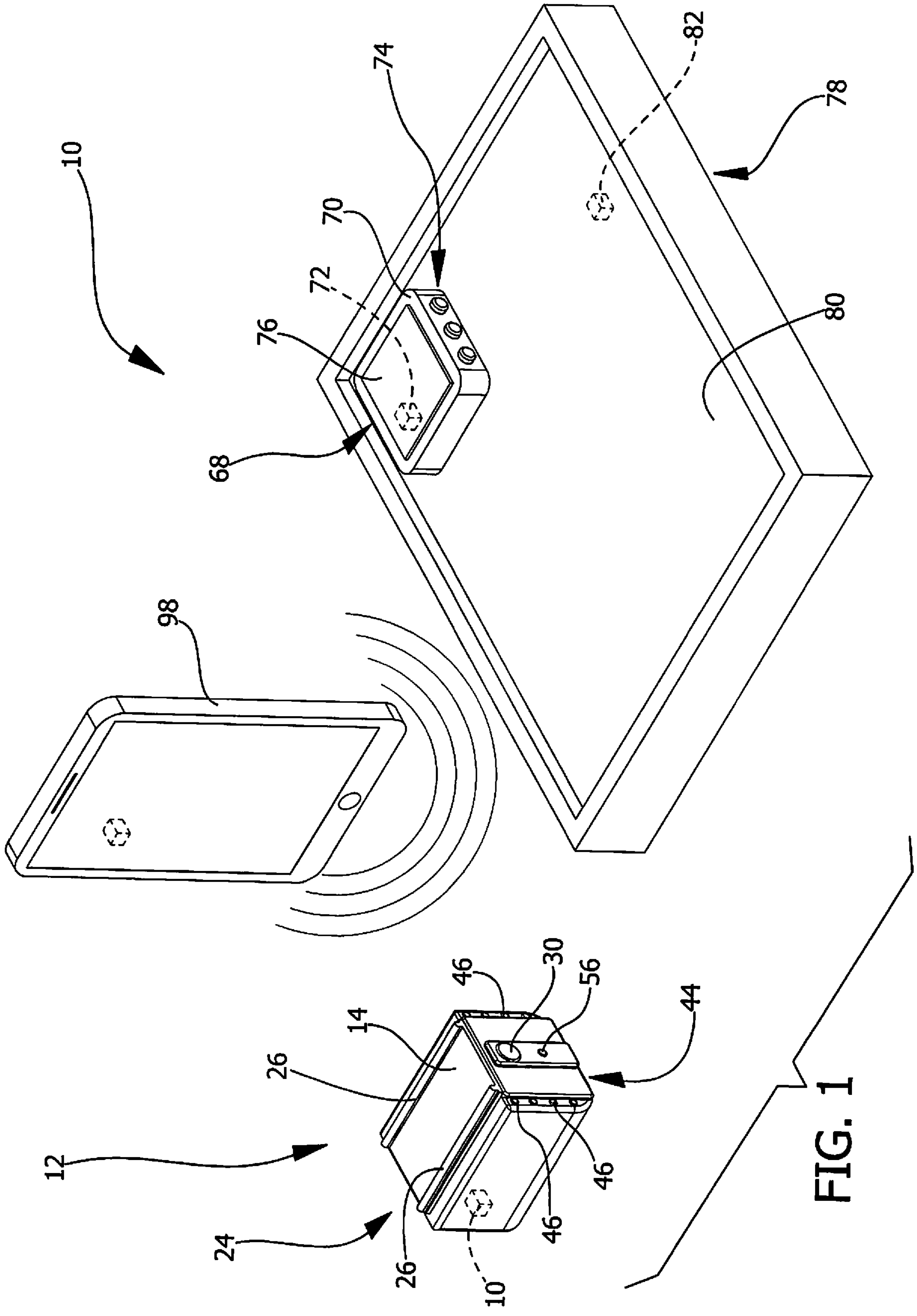
FIG. 1 is a kit view of a firearm monitoring system according to an embodiment of the disclosure.
Figure 2:
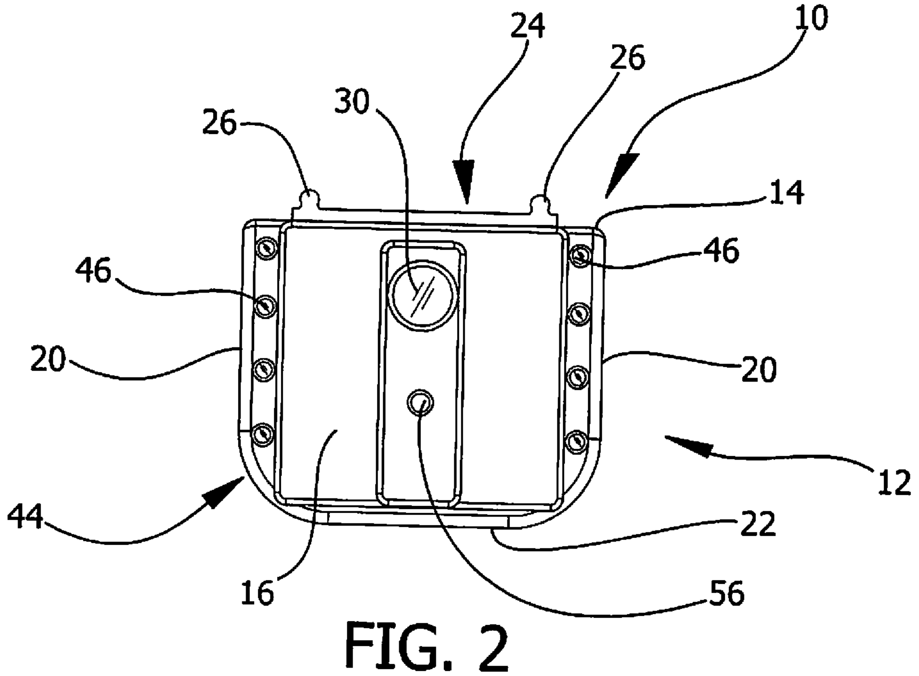
FIG. 2 is a front view of a monitor module of an embodiment of the disclosure.
Figure 3:
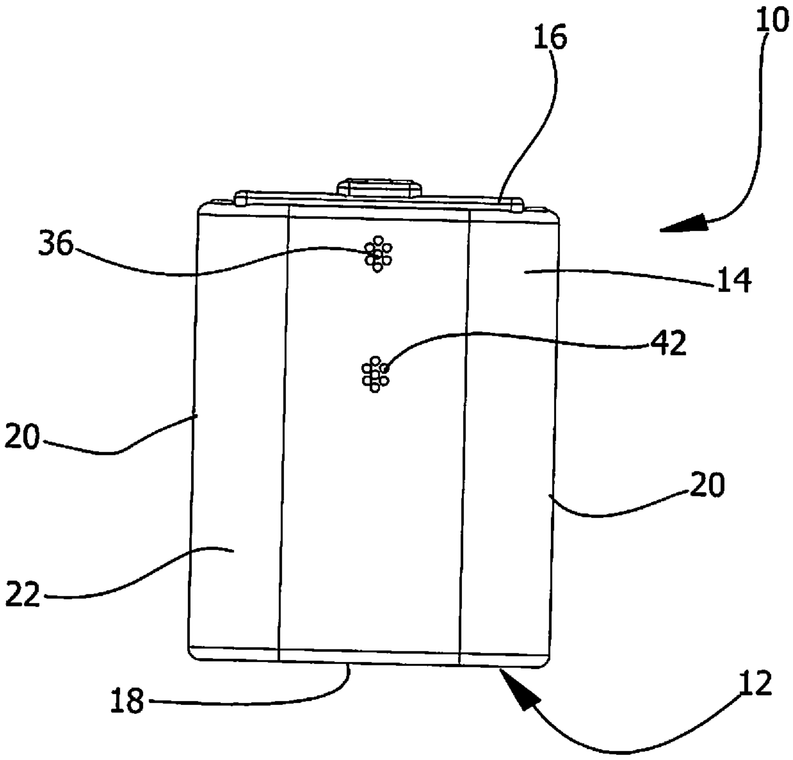
FIG. 3 is a bottom view of a monitor module of an embodiment of the disclosure.
Figure 4:
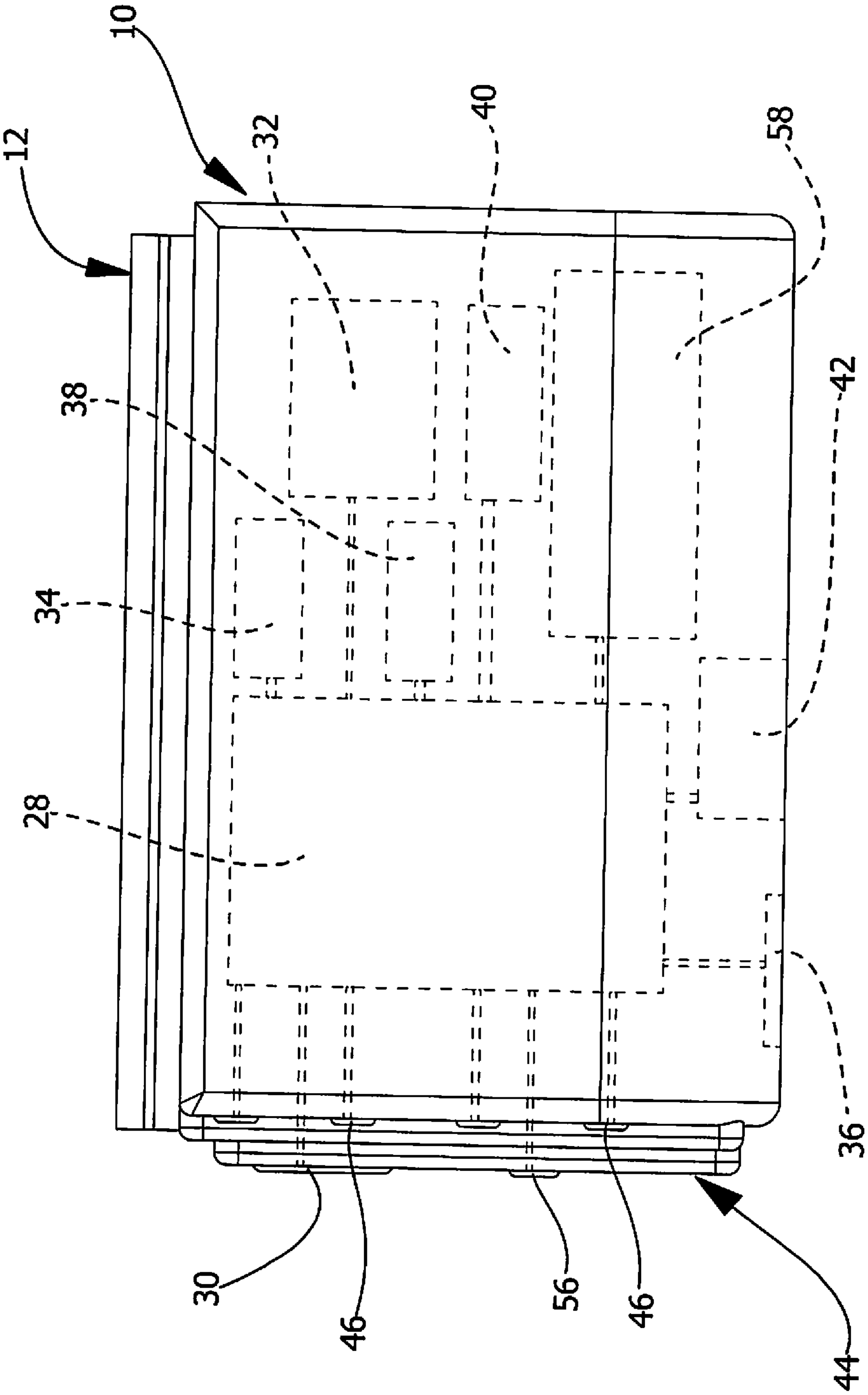
FIG. 4 is a side view of a monitor module of an embodiment of the disclosure.
Figure 5:
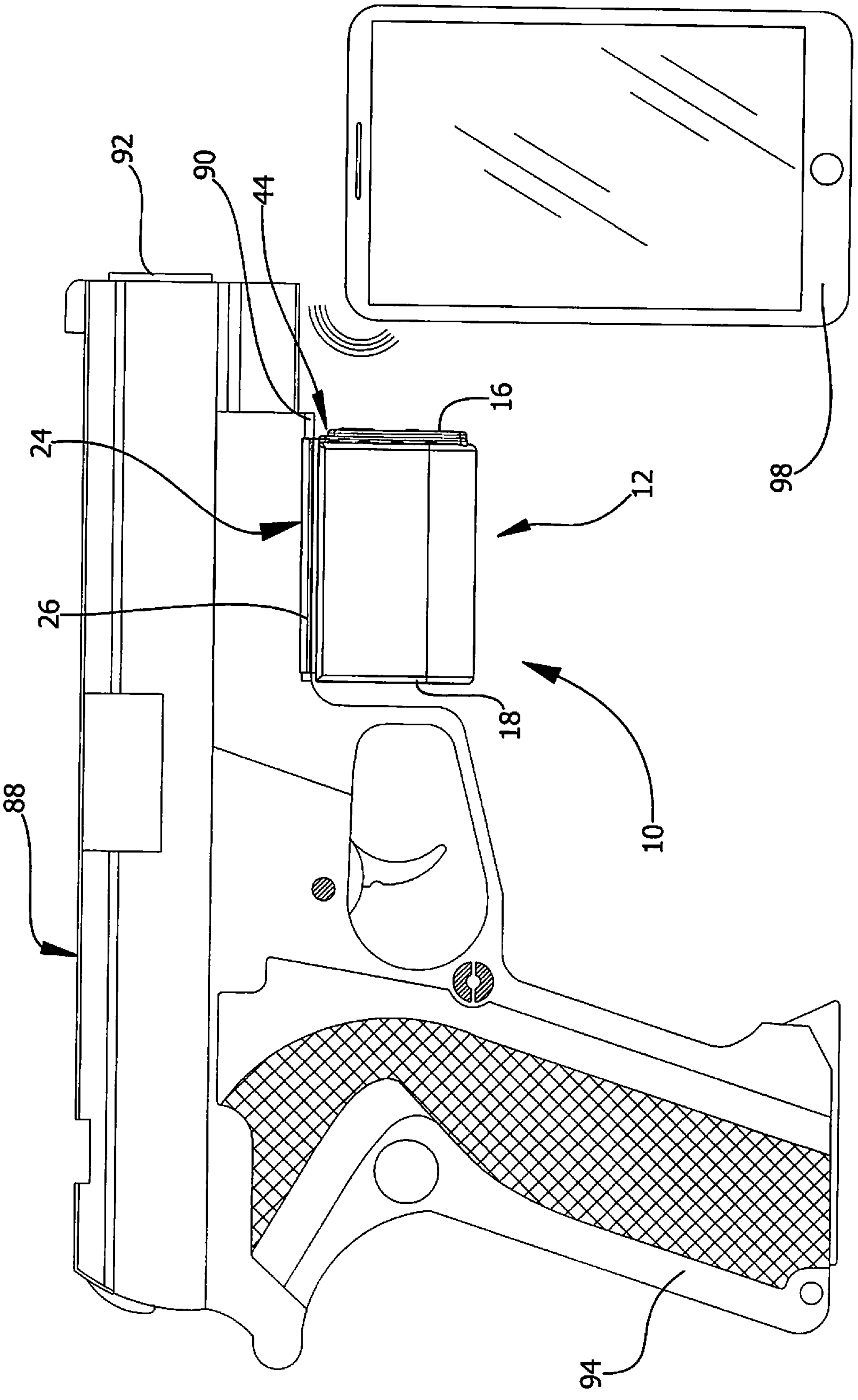
FIG. 5 is an in-use view of a monitor module of an embodiment of the disclosure.
Figure 6:
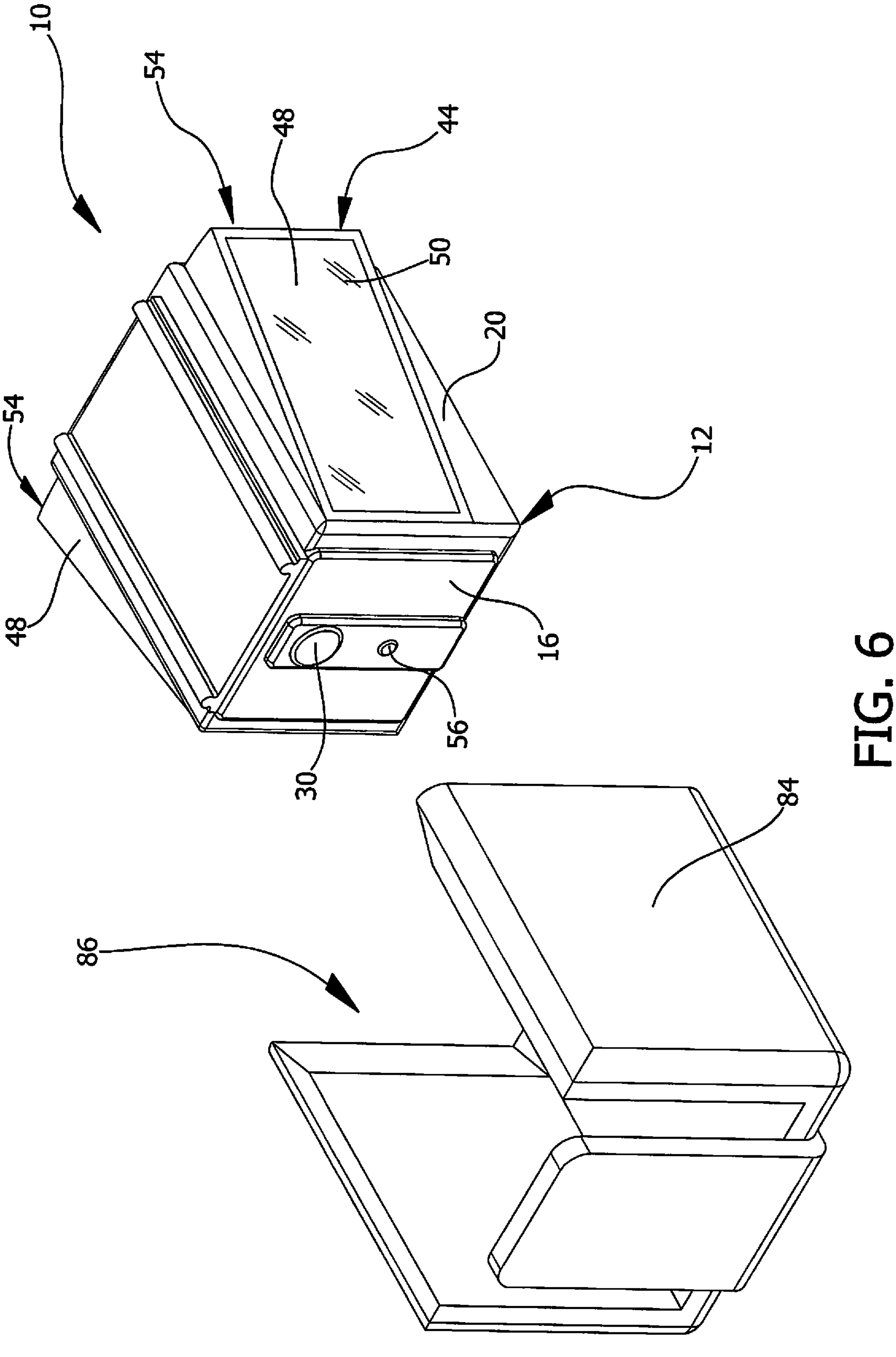
FIG. 6 is a perspective view of a monitor module of an embodiment of the disclosure.

With reference now to the drawings, and in particular to FIGS. 1 through 14 thereof, a new data collection system embodying the principles and concepts of an embodiment of the disclosure and generally designated by the reference numeral 10 will be described.

As best illustrated in FIGS. 1 through 14, the firearm monitoring system 10 generally comprises a monitor module 12 which is attachable to a firearm 88 to monitor use of the firearm 88. The monitor module 12 comprises a housing 14 and a monitor connector 24 which is shaped and operable to mount the housing 14 to the firearm 88. The monitor connector 24 comprises rails 26 for mounting to a rail mount 90 of the firearm 88, but other suitable connection means are anticipated by this disclosure. For example, the monitor connector 24 may comprise a magnetic connector, a snap connector, a hook-and-loop fastener, or the like.

The monitor module 12 also includes a processor 28, a camera 30, and a monitor transceiver 32. The processor 28 is mounted in the housing 14. The camera 30 is mounted to a front side 16 of the housing 14 and faces outwardly away from the housing 14. The camera 30 is operatively coupled to the processor 28. The monitor transceiver 32 is mounted in the housing 14 and is operatively coupled to the processor 28. The monitor transceiver 32 is configured to transmit data to and receive data from a remote control device 98, which may be a smartphone, a personal computer, or the like. The remote control device 98 may have an application stored on its memory which is usable to control the processor 28 and view data transmitted to the remote control device 98. The monitor transceiver 32 is also configured to transmit data to and receive data from a remote observer device 96. For example, the remote control device 98 may be operated to cause the processor 28 to send video or image data captured by the camera 30 to the remote observer device 96 via the monitor transceiver 32. In use, the remote observer device 96 may be operated by an emergency dispatch service, a security team, or the like to assist a user of the monitor module 12. The same video or image data may be transmitted to the remote control device 98. Some embodiments may include a control interface positioned on the housing 14 of the monitor module 12.

The monitor module 12 further includes various other electronic components, including an accelerometer 34, a microphone 36, a global positioning system (GPS) module 38, an orientation sensor 40, a speaker 42, a light source 44, a laser emitter 56, and a power supply 58. Each one of the various other electronic components is mounted to the housing 14 and is operatively coupled to the processor 28. The orientation sensor 40 is configured to detect an orientation of the firearm 88 when the housing 14 is mounted to the firearm 88. The orientation sensor 40 may include one or more of a compass, an inclinometer, another accelerometer, a gyroscope, and the like. The accelerometer 34 may be integral to the orientation sensor 40. The orientation sensor 40 detects parameters indicative of the orientation of the firearm 88 to determine a direction in which a firing end 92 of the firearm 88 faces, which the processor 28 may use in conjunction with data from the GPS module 38 and data from the camera 30 to determine the firearm 88's position and orientation with respect to other objects including geographic features, buildings, people, and the like.

The laser emitter 56 is positioned on the front side 16 of the housing 14 and is oriented to direct laser light forwardly with respect to the housing 14 when activated. The laser emitter 56 may be activated to facilitate aiming the firearm 88 at a desired target. In reference to FIGS. 1 through 5, the light source 44 of one embodiment of the present disclosure includes a plurality of light emitters 46 which are mounted to the front side 16 of the housing 14.

FIGS. 6 through 9 depict another embodiment in which the light source 44 comprises a plurality of movable light emitters 48 mounted on the housing 14. Each movable light emitter 48 is positioned on an associated one of a pair of lateral sides 20 and a bottom side 22 of the housing 14. Each movable light emitter 48 is pivotable between a stored position 52 and a deployed position 54 with respect to the housing 14. Each movable light emitter 48 has an outer surface 50 which is oriented substantially parallel to a front-to-back axis of the housing 14 when the movable light emitter 48 is positioned in the stored position 52 and is oriented to angle away from the housing 14 between the front side 16 of the housing 14 to a rear side 18 of the housing 14 when the movable light emitter 48 is in the deployed position 54.

Each movable light emitter 48 is configured to project light away from its outer surface 50. For example, the movable light emitters 48 may house one or more light emitting elements which emit light through a transparent barrier that is coextensive with the outer surface 50. Or one or more light emitting elements may be mounted on the outer surface 50 such that light is projected away from the outer surface 50. At least some of the light emitted by the movable light emitters 48 is directed forwardly of the housing 14 when the movable light emitters 48 are activated and deployed.

Figure 7:
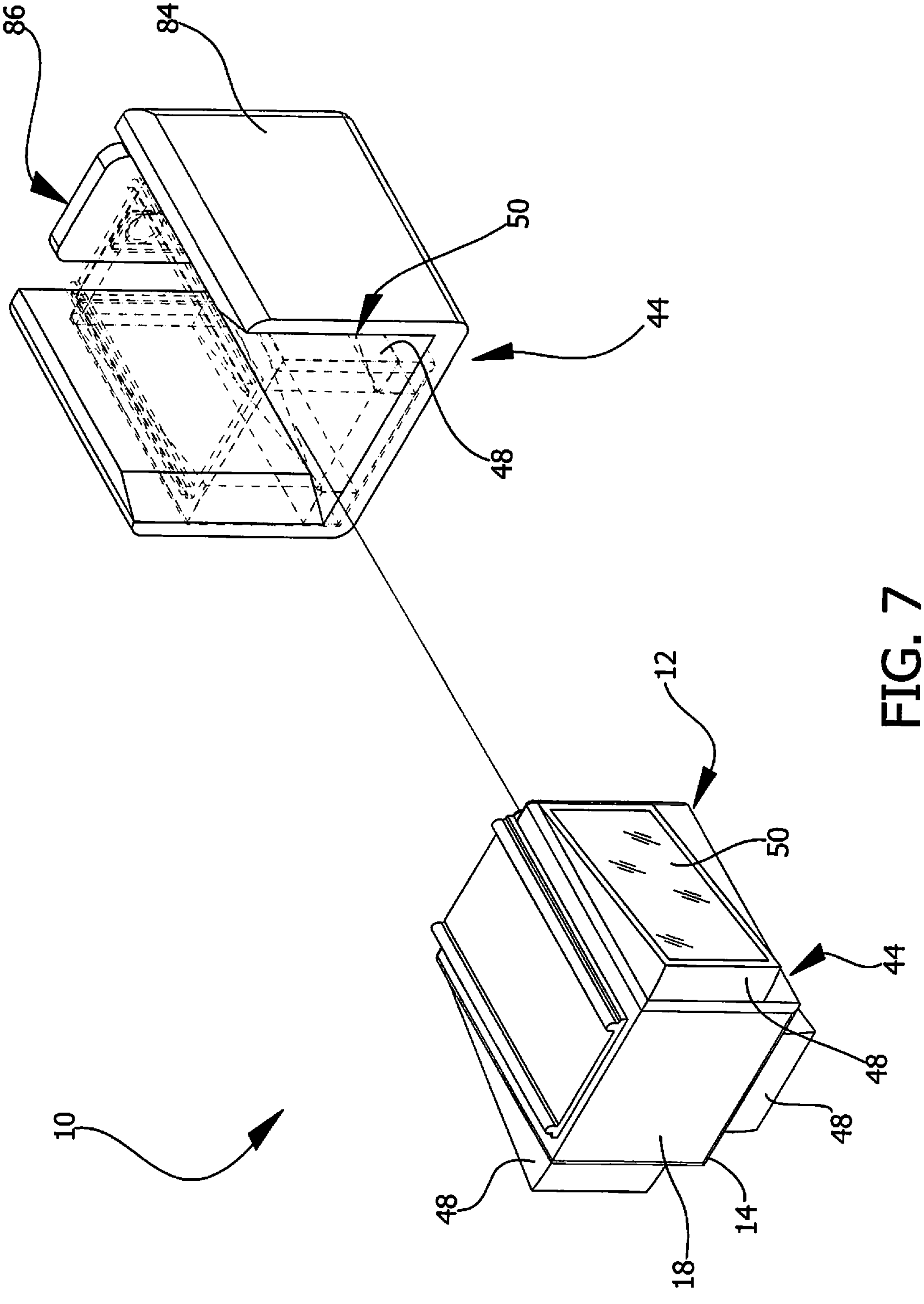
FIG. 7 is a perspective in-use view of a monitor module an embodiment of the disclosure with a holster receiver.
Figure 8:
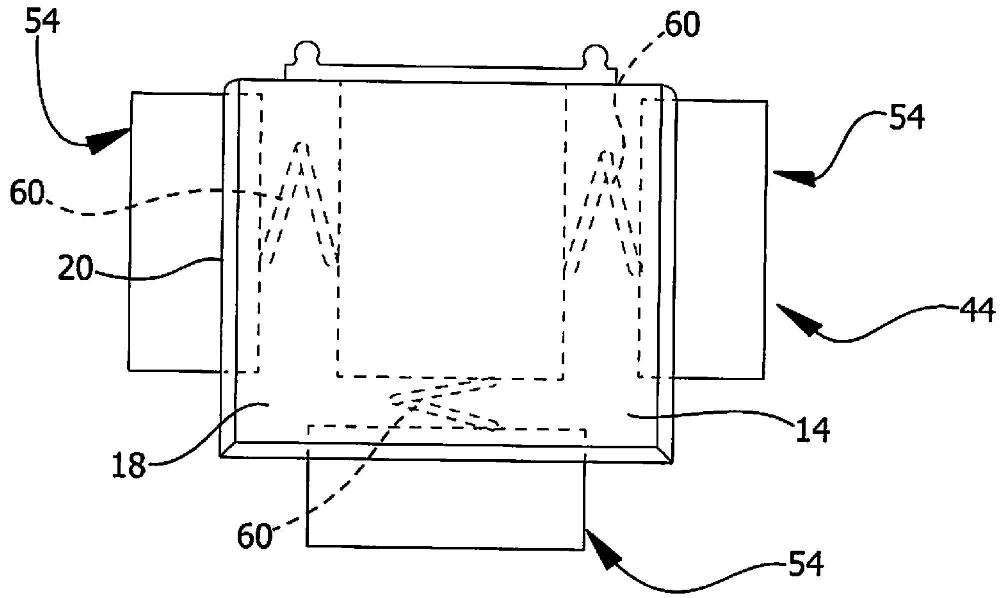
FIG. 8 is a rear view of a monitor module of an embodiment of the disclosure.
Figure 9:
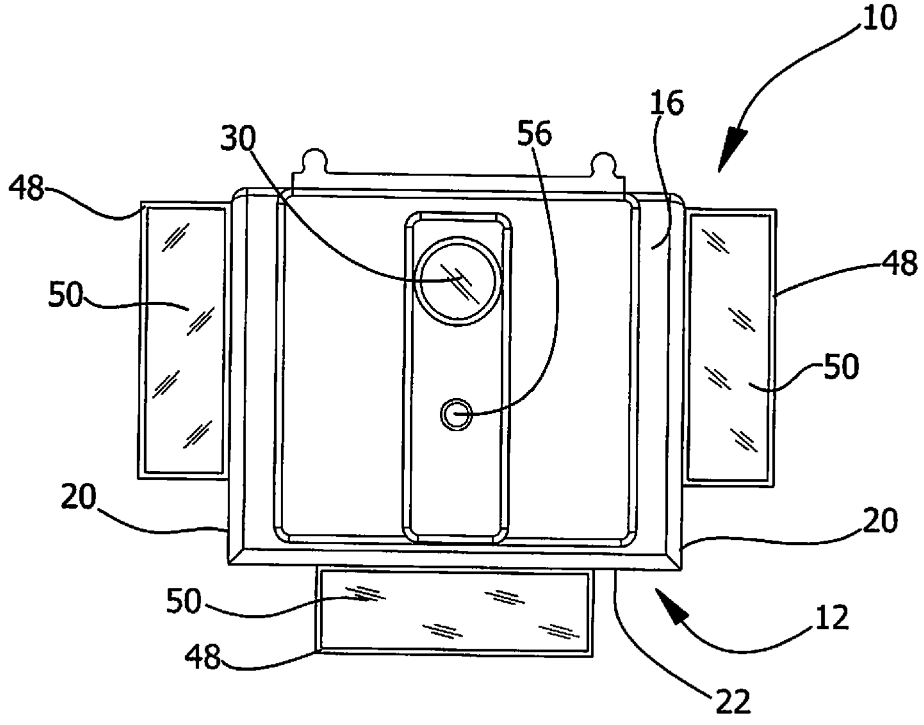
FIG. 9 is a front view of a monitor module of an embodiment of the disclosure.
Figure 10:
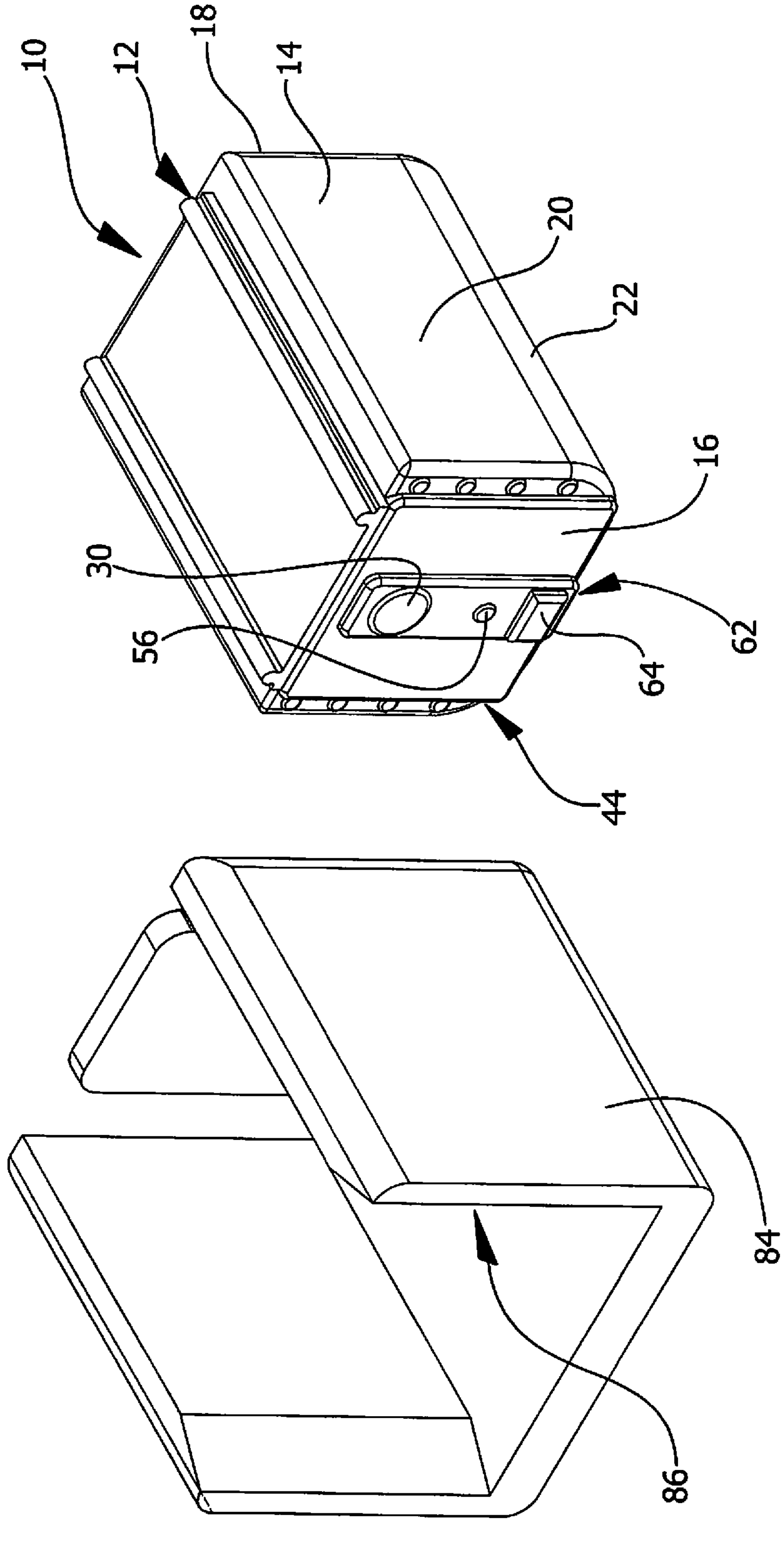
FIG. 10 is a perspective view of a monitor module of an embodiment of the disclosure.
Figure 11:
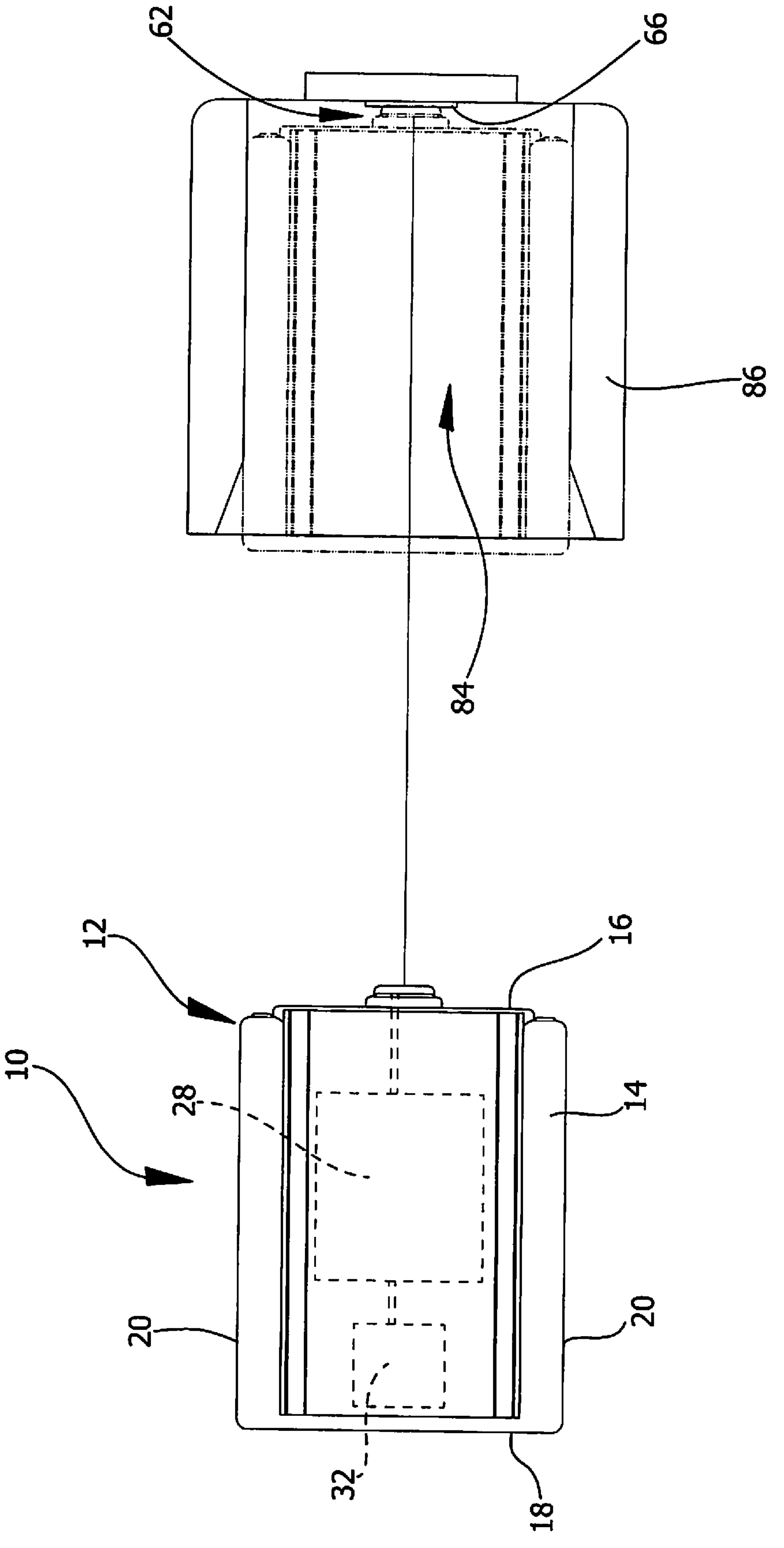
FIG. 11 is a top view of a monitor module of an embodiment of the disclosure.
Figure 12:
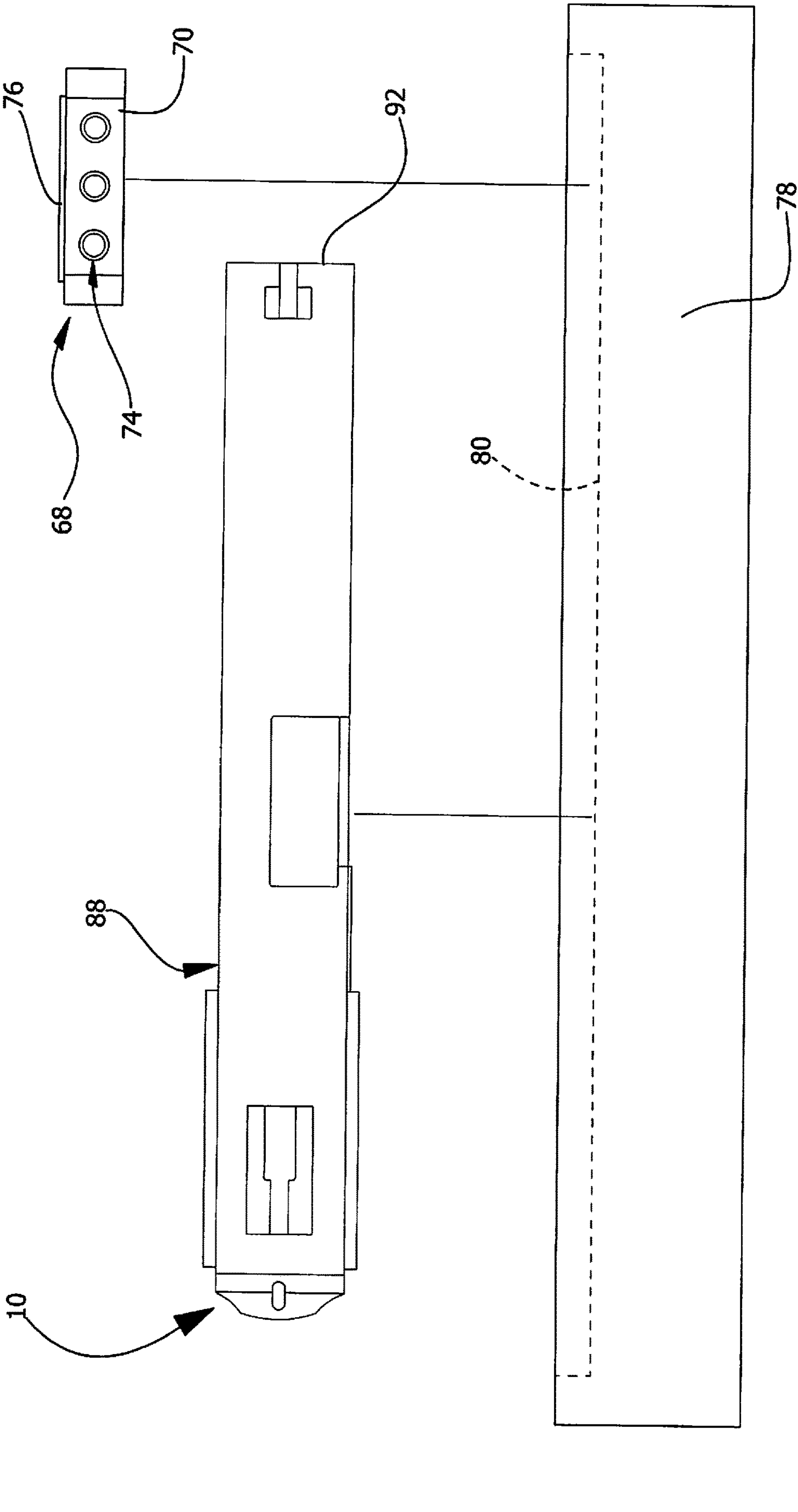
FIG. 12 is a side exploded view of an embodiment of the disclosure.
Figure 13:
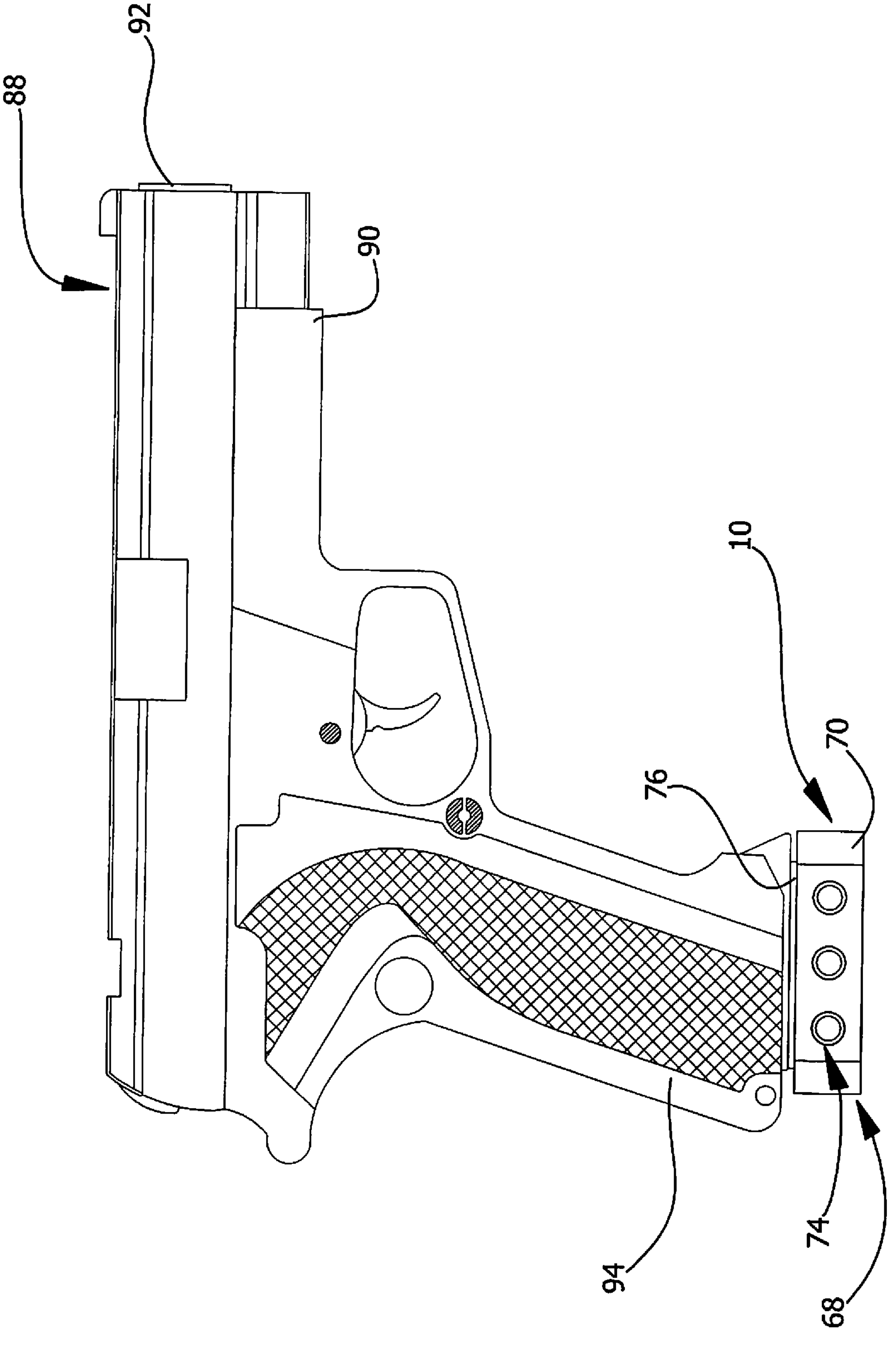
FIG. 13 is side in-use view of a search notification module of an embodiment of the disclosure.
Figure 14:
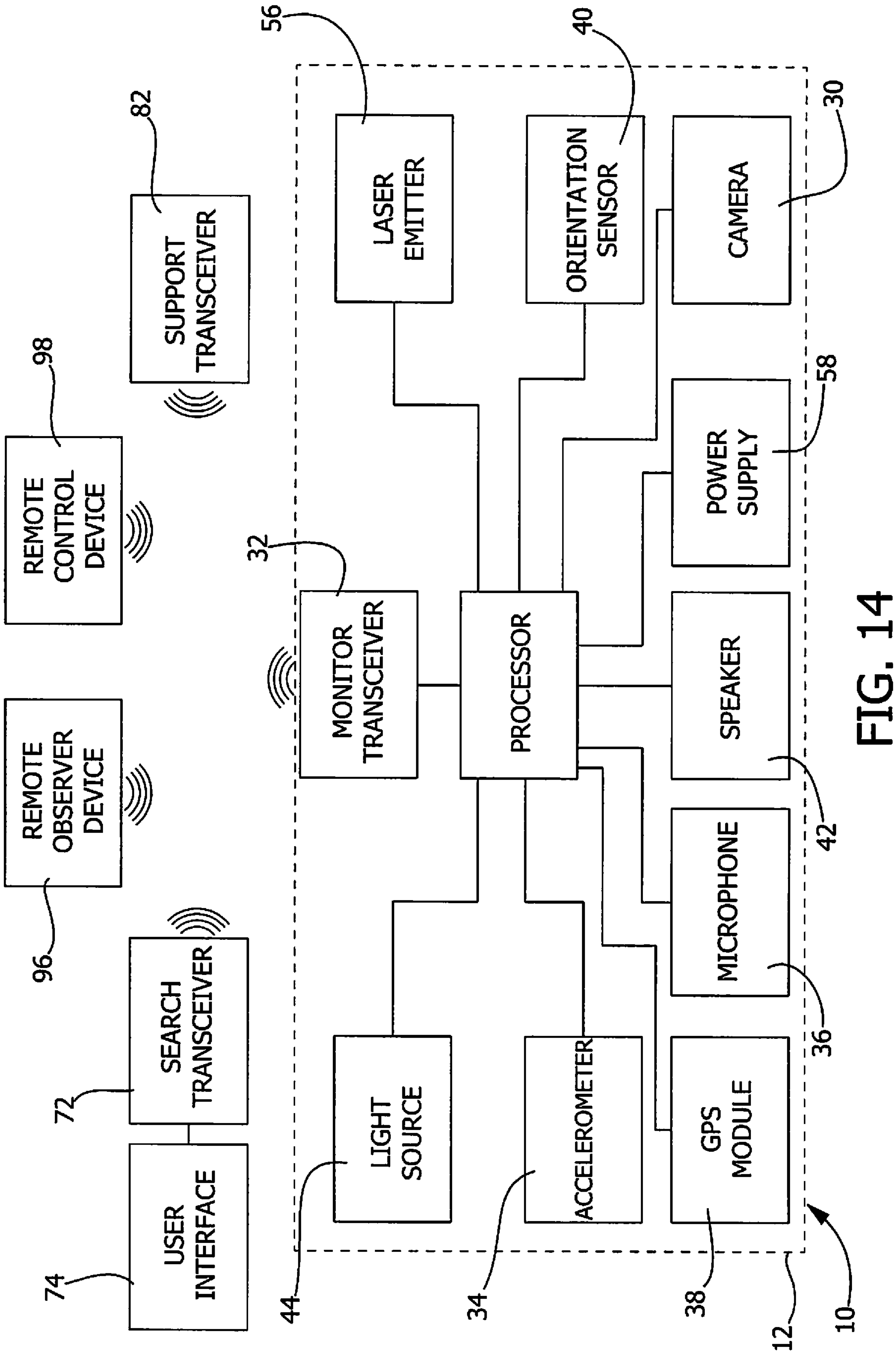
FIG. 14 is a block diagram of an embodiment of the disclosure.

Each movable light emitter 48 is biased toward the deployed position 54 when activated by a compression spring 60 or other suitable biasing member. The Figures also generally depict a holster receiver 84 which defines a bay 86 sized to accommodate the monitor module 12. As shown in FIG. 7, the holster receiver 84 may be used to retain the movable light emitters 48 in their stored positions 52 when the holster receiver 84 holds the monitor module 12. In some embodiments, a movement of the movable light emitters 48 to their deployed positions 54 may actuate switches that activate the movable light emitters 48 to emit light. Such switches may also be operatively coupled to the processor 28 and may send a signal to the processor 28 indicating that the monitor module 12 has been removed from the holster receiver 84 when the movable light emitters 48 move to their deployed positions 54.

The holster receiver 84 may be used in conjunction with a firearm 88 holster that holds the firearm 88 simultaneously with the holster receiver 84 holding the monitor module 12. In such cases, the holster receiver 84 may be coupled to and even integrally formed with the firearm 88 holster. In reference to FIGS. 10 through 11, an embodiment is depicted wherein the monitor module 12 further comprises a holster sensor 62 configured to detect with the firearm 88 is holstered based on whether the monitor module 12 is held by the holster receiver 84. The holster sensor 62 comprises a first sensor member 64 mounted on the housing 14 and a second sensor member 66 mounted in the holster receiver 84. The holster sensor 62 is configured to detect whether the first sensor member 64 is positioned adjacent to the second sensor member 66. When the first sensor member 64 is moved away from the second sensor member 66, the holster sensor 62 sends a signal to the processor 28 indicating that the firearm 88 is being unholstered.

The first sensor member 64 comprises a magnetic sensor, and the second sensor comprises a magnet. The first sensor detects the magnetic field produced by the second sensor member 66 to determine whether the first sensor member 64 is positioned adjacent to the second sensor member 66. In other embodiments, the holster sensor 62 may comprise a proximity sensor, a pressure sensor, electrical contacts, or another suitable sensor adapted to detect whether or not the firearm 88 is holstered.

The power supply 58 is electrically coupled to the processor 28 to supply the processor 28 with electricity. The power supply 58 comprises a battery but may comprise a capacitor or other suitable power storage.

The processor 28 is programmed to enter a data transmission mode upon detecting that the firearm 88 has been unholstered. Detection of an unholstering motion of the firearm 88 may be made via the holster sensor 62, the switches described as actuatable via the movable light emitters 48, the accelerometer 34, or other suitable means. The processor 28 also enters the data transmission mode when the processor 28 determines that a gunshot from the firearm 88 has been heard via the microphone 36. In the data transmission mode, the processor 28 transmits data to the remote observer device 96, including video captured by the camera 30, movement and orientation data captured by the accelerometer 34 and orientation sensors 40, audio captured by the microphone 36, location data captured by the GPS module 38, and the like. The processor 28 may also be programmed to request emergency assistance by transmitting an appropriate alert signal to the remote observer device 96. The processor 28 may also determine when further gunshots are detected by the microphone 36 and send notifications of the same to the remote observer device 96.

A search notification module 68 is configured to wirelessly communicate with the monitor module 12. The search notification module 68 comprises a casing 70 and a search transceiver 72 mounted in the casing 70 which is configured to transmit and receive data to and from each of the monitor transceiver 32 and the remote observer device 96. The search notification module 68 may also have another processor and another power supply. In some cases, the search transceiver 72 facilitates communication with the remote observer device 96 only via the monitor transceiver 32. The search transceiver 72 may also communicate with the remote control device 98 directly, via the monitor transceiver 32 or similar.

The search notification module 68 includes a user interface 74 mounted to the casing 70 and operatively coupled to the search transceiver 72. The user interface 74 is operable to selectively transmit notifications to the remote observer device 96. For example, the user interface 74 may be operated to transmit an initialization signal to the remote observer device 96 indicating a beginning time of a search procedure. A user may use this function to inform operators of the remote observer device 96 that the user is searching the user's home for an intruder or other disturbance. After a predetermined time has passed since sending the initialization signal, an alarm signal is sent to the remote observer device 96 requesting immediate assistance. The predetermined time may be selected by the user in some cases. The user may operate the user interface 74 to send a termination signal to the remote observer device 96 after the initialization signal has been sent to prevent transmission of the alarm signal. The user may use this function, for example, to indicate that the search procedure has been completed without finding an intruder or other disturbance which would require emergency services. The user interface 74 is also operable to cause the processor 28 of the monitor module 12 to execute a voice call with the remote observer device 96 via the monitor transceiver 32, the microphone 36, and the speaker 42.

The search notification module 68 also includes a search connector 76 which is configured to mount the search notification module 68 to the firearm 88. The search notification module 68 comprises a magnet which may be used to attach the search notification module 68 to a magazine or a grip 94 of the firearm 88. However, any suitable connector may be used, including a latch, a clamp, a snap connector, a hook-and-loop fastener, or the like.

A support pad 78 is also provided for use with the monitor module 12 and the search notification module 68. The support pad 78 has an upper surface 80 configured for supporting the firearm 88, the monitor module 12, and the search notification module 68. The support pad 78 includes a support transceiver 82 configured to transmit and receive data to and from the monitor transceiver 32 and the search transceiver 72. The support transceiver 82 may also be configured to communicate with the remote observer device 96 and the remote control device 98, either directly or indirectly through the monitor transceiver 32, the search transceiver 72, or similar. The support pad 78 may also include another processor and another power supply.

The processor 28 of the monitor module 12 is programmed to detect when either of the monitor module 12 and the search notification module 68 is moved away from the upper surface 80 of the support pad 78 via data transmission between the support transceiver 82, the monitor transceiver 32, and the search transceiver 72. Such data transmission may include transmitting signals using locating algorithms such as trilateration or triangulation. In some cases, other sensors may be used to detect when either of the monitor module 12 and the search notification module 68 is moved from atop the support pad 78. The processor 28 enters the data transmission mode when the monitor module 12 is moved away from the upper surface 80 of the support pad 78, and the processor 28 causes the search transceiver 72 to transmit the initialization signal to the remote observer device 96 when the search notification device is moved away from the upper surface 80 of the support pad 78.

As detailed above, the firearm 88 monitoring system 10 is used to capture data related to the use of the firearm 88 and send the data to the remote observer device 96. When the remote observer device 96 is used by a remote dispatch team or similar, the remote dispatch team may use the data received to dispatch emergency assistance to the user of the firearm 88. The processor 28 of the monitor module 12 transmits data upon detection of the unholstering motion of the firearm 88 or upon a corresponding control signal input by the user via the remote control device 98 or other interface. The search notification module 68 may also be used as described to send further information to the remote observer device 96.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A firearm monitoring system comprising:

a monitor module comprising:

a housing;

a monitor connector configured to mount the housing to a firearm;

a processor mounted in the housing;

a camera mounted to a front side of the housing, the camera facing outwardly away from the housing, the camera being operatively coupled to the processor; and a monitor transceiver mounted in the housing and operatively coupled to the processor, the monitor transceiver being configured to transmit data to and receive data from a remote control device, the monitor transceiver being configured to transmit data to and receive data from a remote observer device;

wherein the processor is programmed to detect an unholstering motion of the firearm, the processor being programmed and configured to transmit images captured by the camera to the remote observer device via the monitor transceiver upon detection of the unholstering motion; and a support pad having an upper surface configured for supporting the firearm, the monitor module, and the search notification module, the support pad including a support transceiver configured to transmit and receive data to and from the monitor transceiver, wherein the processor of the monitor module is programmed to detect when the monitor module is moved away from the upper surface of the support pad via data transmission between the support transceiver and the monitor transceiver, the processor entering the data transmission mode when the monitor module is moved away from the upper surface of the support pad.

2. The system of claim 1, wherein the monitor module further comprises an accelerometer mounted in the housing and operatively coupled to the processor, the accelerometer being configured to detect the unholstering motion of the firearm.

3. The system of claim 1, wherein the monitor module further comprises a holster sensor configured to detect when the firearm is holstered, the holster sensor comprising a first sensor member coupled to the housing and a second sensor member configured to be mounted in a holster receiver, the holster sensor being configured to detect whether the first sensor member is positioned adjacent to the second sensor member.

4. The system of claim 3, wherein the first sensor member comprises a magnetic sensor and the second sensor member comprises a magnet, the first sensor member being configured to detect a magnetic field produced by the second sensor member.

5. The system of claim 1, wherein the monitor module further comprises a microphone mounted to the housing and operatively coupled to the processor, the microphone being configured to detect a gunshot from the firearm.

6. The system of claim 1, wherein the monitor module further comprises a global positioning system (GPS) module mounted in the housing and operatively coupled to the processor.

7. The system of claim 1, wherein the monitor module further comprises an orientation sensor mounted in the housing and operatively coupled to the processor, the orientation sensor being configured to detect an orientation of the firearm.

8. The system of claim 1, wherein the monitor module further comprises a speaker mounted to the housing and operatively coupled to the processor.

9. The system of claim 1, wherein the monitor module further comprises a light source mounted to the housing and operatively coupled to the processor, the light source being oriented to direct light forwardly with respect to the housing when activated.

10. The system of claim 9, wherein the light source comprises a plurality of light emitters mounted on the front side of the housing.

11. The system of claim 9, wherein the light source comprises a plurality of movable light emitters mounted on the housing, each movable light emitter being positioned on an associated one of a pair of lateral sides and a bottom side of the housing, the outer surface being oriented to angle away from the housing between the front side of the housing to a rear side of the housing when the movable light emitter is in a deployed position, each movable light emitter being configured to project light away from its outer surface, each movable light emitter being biased toward the deployed position when activated.

12. The system of claim 1, wherein the monitor module further comprises a laser emitter mounted to the front side of the housing and operatively coupled to the processor, the laser emitter being oriented to direct a visible laser forwardly with respect to the housing when activated.

13. The system of claim 1, wherein the monitor module further comprises a power supply mounted in the housing and electrically coupled to the processor, the power supply comprising a battery.

14. A firearm monitoring system comprising:

a monitor module comprising:

a housing;

a monitor connector configured to mount the housing to a firearm;

a processor mounted in the housing;

a camera mounted to a front side of the housing, the camera facing outwardly away from the housing, the camera being operatively coupled to the processor; and a monitor transceiver mounted in the housing and operatively coupled to the processor, the monitor transceiver being configured to transmit data to and receive data from a remote control device, the monitor transceiver being configured to transmit data to and receive data from a remote observer device;

wherein the processor is programmed to detect an unholstering motion of the firearm, the processor being programmed and configured to transmit images captured by the camera to the remote observer device via the monitor transceiver upon detection of the unholstering motion; and a search notification module configured to wirelessly communicate with the monitor module, the search notification module comprising:

a casing;

a search transceiver mounted in the casing, the search transceiver being configured to transmit and receive data to and from each of the monitor transceiver and the remote observer device; and a user interface mounted to the casing and operatively coupled to the search transceiver, the user interface being operable to selectively transmit notification data to the remote observer device, the notification data including an initialization signal indicating a beginning time of a search procedure, the notification data including a termination signal indicating a termination of the search procedure, wherein the processor of the monitor module is configured to send an alarm signal to the remote observer device a predetermined time after the initialization signal is sent if the termination signal has not been sent.

15. The system of claim 14, wherein:

the monitor module further comprises:

a microphone mounted to the housing and operatively coupled to the processor; and a speaker mounted to the housing and operatively coupled to the processor; and the user interface of the search notification module is operable to cause the processor of the monitor module to execute a voice call with the remote observer device via the monitor transceiver, the microphone, and the speaker.

16. The system of claim 14, wherein the search notification module further comprises a search connector configured to mount the search notification module to the firearm.

17. The system of claim 14, further comprising a support pad having an upper surface configured for supporting the firearm, the monitor module, and the search notification module, the support pad including a support transceiver configured to transmit and receive data to and from the monitor transceiver and the search transceiver, wherein the processor of the monitor module is programmed to detect when either of the monitor module and the search notification module is moved away from the upper surface of the support pad via data transmission between the support transceiver, the monitor transceiver, and the search transceiver, the processor being programmed and configured to transmit data to the remote observer device when the monitor module is moved away from the upper surface of the support pad, the processor causing the search transceiver to transmit the initialization signal to the remote observer device when the search notification device is moved away from the upper surface.

18. A firearm monitoring system comprising:

a monitor module comprising:

a housing;

a monitor connector configured to mount the housing to a firearm;

a processor mounted in the housing;

a camera mounted to a front side of the housing, the camera facing outwardly away from the housing, the camera being operatively coupled to the processor;

a monitor transceiver mounted in the housing and operatively coupled to the processor, the monitor transceiver being configured to transmit data to and receive data from a remote control device, the monitor transceiver being configured to transmit data to and receive data from a remote observer device;

an accelerometer mounted in the housing and operatively coupled to the processor, the accelerometer being configured to detect an unholstering motion of the firearm;

a microphone mounted to the housing and operatively coupled to the processor, the microphone being configured to detect a gunshot from the firearm;

a global positioning system (GPS) module mounted in the housing and operatively coupled to the processor;

an orientation sensor mounted in the housing and operatively coupled to the processor, the orientation sensor being configured to detect an orientation of the firearm;

a speaker mounted to the housing and operatively coupled to the processor;

a light source mounted to the housing and operatively coupled to the processor, the light source being oriented to direct light forwardly with respect to the housing when activated;

a laser emitter mounted to the front side of the housing and operatively coupled to the processor, the laser emitter being oriented to direct a visible laser forwardly with respect to the housing when activated; and a power supply mounted in the housing and electrically coupled to the processor, the power supply comprising a battery;

wherein the processor is programmed to enter a data transmission mode upon the accelerometer detecting the unholstering motion of the firearm or the microphone detecting the gunshot from the firearm, the processor being programmed and configured to transmit data to the remote observer device via the monitor transceiver when in the data transmission mode;

a search notification module configured to wirelessly communicate with the monitor module, the search notification module comprising:

a casing;

a search transceiver mounted in the casing, the search transceiver being configured to transmit and receive data to and from each of the monitor transceiver and the remote observer device;

a user interface mounted to the casing and operatively coupled to the search transceiver, the user interface being operable to selectively transmit notification data to the remote observer device, the notification data including an initialization signal indicating a beginning time of a search procedure, the notification data including a termination signal indicating a termination of the search procedure, wherein the processor of the monitor module is configured to send an alarm signal to the remote observer device a predetermined time after the initialization signal is sent if the termination signal has not been sent, the user interface being operable to cause the processor of the monitor module to execute a voice call with the remote observer device via the monitor transceiver, the microphone, and the speaker; and a search connector configured to mount the search notification module to the firearm; and a support pad having an upper surface configured for supporting the firearm, the monitor module, and the search notification module, the support pad including a support transceiver configured to transmit and receive data to and from the monitor transceiver and the search transceiver;

wherein the processor of the monitor module is programmed to detect when either of the monitor module and the search notification module is moved away from the upper surface of the support pad via data transmission between the support transceiver, the monitor transceiver, and the search transceiver, the processor entering the data transmission mode when the monitor module is moved away from the upper surface of the support pad, the processor causing the search transceiver to transmit the initialization signal to the remote observer device when the search notification device is moved away from the upper surface.

* * * * *